Sept. 23, 1958  J. WALLACE  2,852,965
DASHPOT DEVICE

Filed Feb. 6, 1956  2 Sheets-Sheet 1

INVENTOR.
JOHN WALLACE
BY
HIS ATTORNEY.

Sept. 23, 1958  J. WALLACE  2,852,965
DASHPOT DEVICE

Filed Feb. 6, 1956  2 Sheets-Sheet 2

INVENTOR.
JOHN WALLACE
BY
Benjamin J. Barish
HIS ATTORNEY.

United States Patent Office 2,852,965
Patented Sept. 23, 1958

2,852,965

DASHPOT DEVICE

John Wallace, Detroit, Mich., assignor to Burroughs Corporation, Detroit, Mich., a corporation of Michigan Application February 6, 1956, Serial No. 563,489

11 Claims. (Cl. 77—32.3)

This invention relates to a device in the nature of a dashpot, and particularly to one which is especially adapted for controlling the feed of a machine tool, such as a drill or the like, during a step-by-step or intermittent machining, e. g. drilling, operation.

In drilling deep or small diameter holes, each hole may be drilled in a plurality of steps by drilling partially through, withdrawing the drill to facilitate cooling and clearing it of chips, and returning the drill for another step, this sequence being repeated for any desired number of steps until the operation is completed. Where this operation has been performed by automatic drilling machines, complicated controls have heretofore been required to effect, for each step, a rapid approach of the drill to the workpiece, a slower feed for drilling a fraction of the depth of the hole, a rapid withdrawal of the drill, and then a rapid return to the point of withdrawal for drilling another fractional part of the hole. Moreover, in returning the drill to the point of withdrawal for the succeeding step, it is necessary that the rapid return be to a position just short of the point of withdrawal lest the cutting edges of the drill be chipped, which has heretofore further complicated the controls required. This invention provides a simple and inexpensive device eminently suitable for controlling the feed of a drill in the above-described operation.

An object of the invention is to provide a new and improved dashpot type of device.

Another object of the invention is to provide a simple, inexpensive and efficient dashpot type of device which is especially useful for controlling the feed of a drill, or the like, during a step-by-step or intermittent drilling operation.

A still further object of the invention is to provide a device for controlling the feed of a drill or the like tool, whereby the tool may be intermittently withdrawn from the workpiece and then rapidly returned to a position just short of the point of its withdrawal.

These and additional objects and advantages are obtainable by this invention which is hereinafter described for illustrative purposes as embodied in a dashpot type of device for controlling the feed of a drill in a step-by-step or intermittent drilling operation. For purposes of this description, the device is shown as a separate, self-contained unit to be attached to an automatically fed drilling machine, it being understood that the novel features of the device could be used in other applications, and could be incorporated into presently known feed control arrangements for drilling machines.

The disclosed device comprises a fluid cylinder and a plunger displaceable therein in accordance with a desired rate, which rate is preselected by a valve regulating the fluid flow from the cylinder. A member is provided having a lost-motion connection with the plunger and is adapted to be moved by the plunger only after the latter has been displaced a relatively short predetermined distance in the cylinder. The plunger is constantly urged by resilient means in the direction of restoring this lost-motion connection. In the disclosed device, the foregoing member is in the form of a sleeve freely mounted on the plunger and is normally spaced from an abutting element of the plunger, the latter being in the form of an end cap. Also in the disclosed device, the resilient means is a coil spring interposed between the plunger end cap and the sleeve.

Where this device is used in the step-by-step drilling operation to be described, the end cap of the plunger is engaged by a movable element of the drill feeding means during the rapid approach of the drill to the workpiece, which causes the plunger to be displaced in the cylinder at the slower feeding rate as preselected by the valve. The sleeve, however, is not engaged by the plunger end cap until the latter has traversed the distance of the lost-motion connection, compressed the coil spring, and engaged the upper surface of the sleeve, at which time the sleeve is also moved in the cylinder along with the plunger. At the completion of a step and as the drill is rapidly withdrawn, the plunger end cap is released thus restoring the lost-motion connection under the influence of the coil spring. When this occurs, the sleeve is normally retained in the position to which it was moved during feeding, by the friction against the side walls of the cylinder, but the plunger is raised by the spring the distance of the lost-motion connection, the level of the fluid in the cylinder also being permitted to rise this amount by the valve which permits the full flow of the fluid in this direction.

Thus, as the next drilling step commences, the drill may be rapidly returned until the plunger end cap is again engaged which will be at a slightly higher position. The feeding rate is thus reduced when the drill is positioned with respect to the workpiece just short of the point of its withdrawal.

For a better understanding of the invention, reference may be had to the accompanying drawings illustrating a preferred embodiment thereof wherein.

Figure 4:
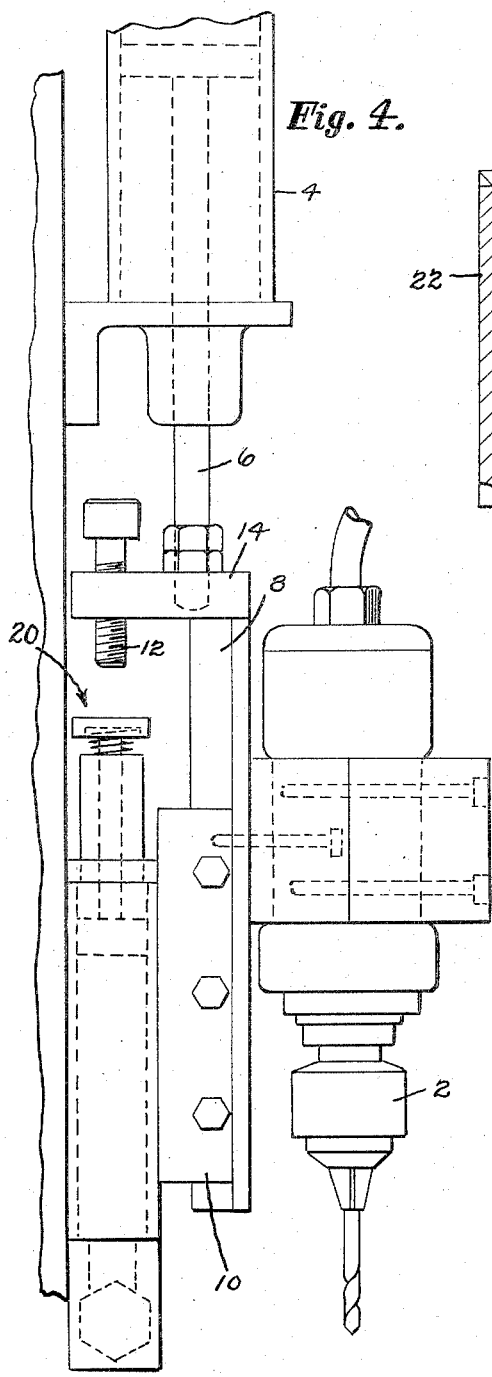
Fig. 4 is a front elevational view of a drilling machine utilizing the novel device of Figs. 1–3 for controlling the feed of the drill.

Referring at first to Fig. 4 illustrating the novel dashpot device utilized for controlling the feed of a drilling machine, it will be seen that the drill 2 is fed by any suitable means, such as an air cylinder 4 having a reciprocating piston 6 which supports and feeds the drill through the medium of a drill carrier 8. The drill is guided towards and away from the workpiece by a guide member 10 supported on a stationary part of the machine. During the course of a rapid approach of the drill towards the workpiece, an adjustable stud 12 threaded through an arm 14 of the drill carrier 8 engages the novel dashpot device, generally designated as 20, whereupon the feeding of the drill will be controlled in the manner briefly described above and to be described below in more detail.

Figure 1:
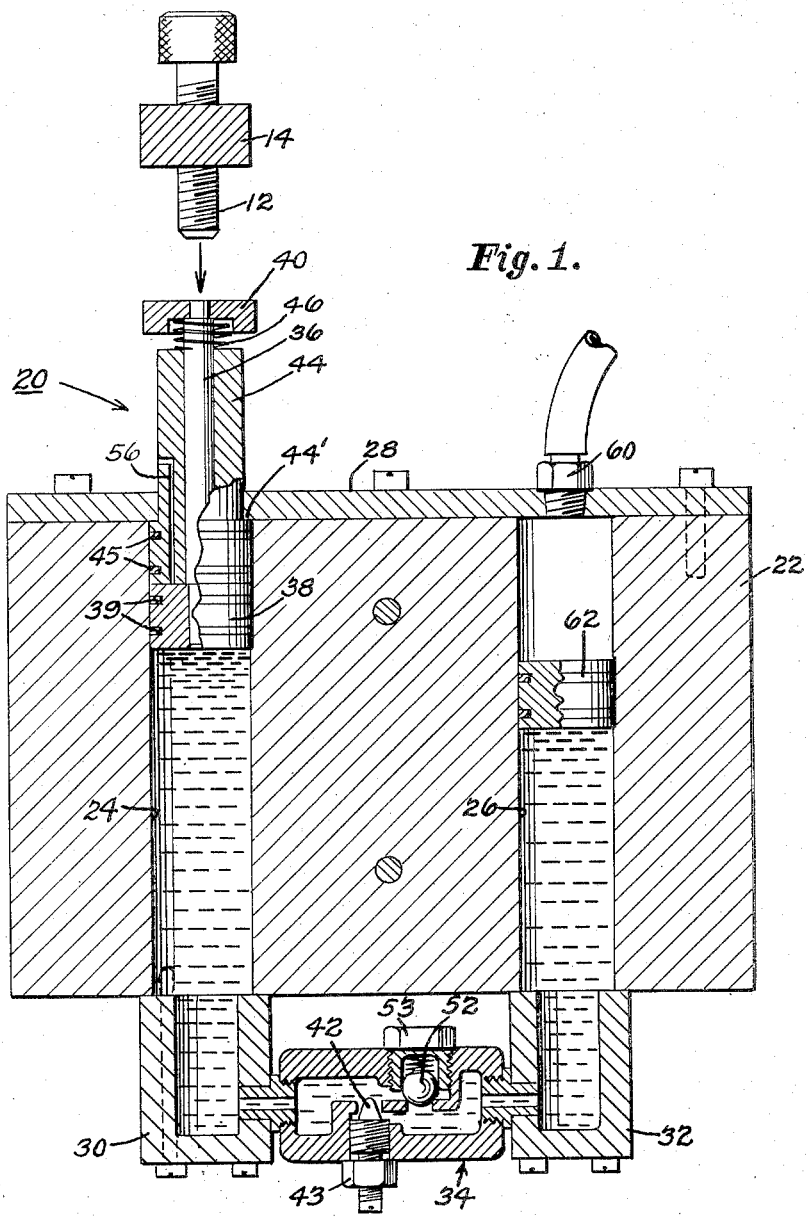
Fig. 1 is an enlarged, longitudinal sectional view of a novel dashpot type of device constructed in accordance with the invention and showing the various parts thereof in their initial positions.

With particular reference to Fig. 1, the dashpot device comprises a rectangular-shaped housing 22 provided with a pair of cylindrical bores 24 and 26 extending therethrough, the housing being closed at one side by end plate 28. The opposite side of the housing is provided with a pair of end fittings 30 and 32 and a valve fitting 34 interconnecting the two bores and providing a passageway for the fluid, preferably oil, contained therein. As will be described below in detail, the valve fitting 34 controls the flow of the oil from bore 24, serving as an oil cylinder, to bore 26, serving as an oil reservoir, and vice versa, during the feeding of the drill.

Control of the feeding of the drill is accomplished by a plunger 36 having a piston 38 fixed to one end thereof and disposed in the oil cylinder 24, and an end cap 40 fixed to its opposite end and extending exterior to the housing. As end cap 40 is engaged by stud 12 carried by the drill feeding means, plunger 36 and its piston 38 are thereby displaced in the oil cylinder 24 in accordance with the desired rate of feed of the drill 2. This rate of feed is preselected by appropriately adjusting a needle valve 42 of fitting 34 to regulate the oil flow from the cylinder 24 to the reservoir 26. It will thus be seen that as stud 12 contacts cap 40 of the plunger 36 during the rapid approach of the drill to the workpiece, the feed of the drill will thenceforth be retarded to the preselected rate of displacement of the plunger in the oil cylinder.

An important feature of the novel dashpot is the provision of a sleeve 44 freely mounted on the plunger 36. This sleeve also extends into the oil cylinder 24, but its upper surface is spaced from the plunger end cap 40 by a coil spring 46 interposed therebetween. This arrangement provides a lost-motion connection between the plunger end cap and the sleeve, so that the latter will not be moved into the cylinder until the plunger has been displaced the short predetermined distance of this lost-motion connection.

As mentioned earlier, needle valve 42 of the fitting 34 regulates the flow of oil in the direction from the oil cylinder 24 to the reservoir 26 in accordance with the preselected rate of drill feed. Fitting 34 is also provided with a floating ball valve 52 which permits the free flow of the oil in the reverse direction, that is from the oil reservoir 26 to the oil cylinder 24. Adjusting nuts, 43 and 53 respectively, are provided for making preliminary adjustments to these valves.

The operation of the device, in-so-far as described to this point, is as follows:

Assuming that the machine is in the position of Fig. 4 for drilling the first step of a hole, the air cylinder 4 is operated by any suitable means to effect a rapid approach of the drill towards the workpiece. Just before the drill engages the workpiece, stud 12 movable with the drill carrier contacts plunger end cap 40 of the dashpot. Stud 12 can be conveniently adjusted for this purpose by appropriately threading it in arm 14 of the drill carrier 8.

Before the stud contacts the end cap, the parts of the dashpot occupy their initial positions shown in Fig. 1, wherein the sleeve 44 is spaced from the end cap by coil spring 46. As stud 12 engages the end cap, its plunger 36 together with its piston 38 are displaced thereby in oil cylinder 24. However, during this initial movement of the plunger, sleeve 44, being free on the plunger, is not moved thereby but it retained substantially in its initial position because of its friction against the inner surfaces of the oil cylinder 24. This frictional resistance of the sleeve 44 may be effected by an appropriate selection of sealing rings 45 inserted in grooves at the lower end thereof disposed in the cylinder. Piston 38 of plunger 36 may also be provided with sealing rings 39.

Figure 2:
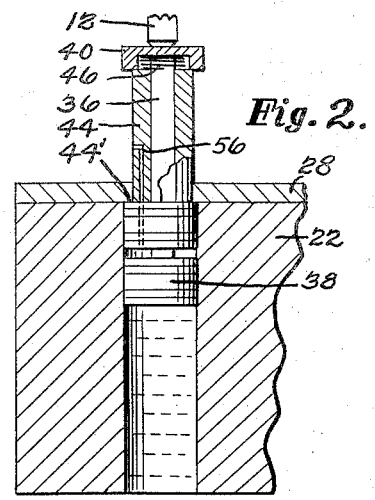
Fig. 2 is a fragmentary sectional view of the device of Fig. 1 illustrating the plunger and sleeve in the positions they occupy after the plunger has traversed the space of the lost-motion connection.

Thus, after the plunger 36 has moved the short distance between its end cap 40 and the upper surface of sleeve 44, and before sleeve 44 is caused to move, the parts will occupy the positions shown in Fig. 2, wherein cap 40 contacts sleeve 44, coil spring 46 is compressed, and the lower end of the sleeve is spaced from the upper surface of the piston 38 carried by the plunger 36. The vacuum that otherwise might be formed in the space between piston 38 and the sleeve 44 is vented by a bore 56 passing through the sleeve.

It will be appreciated that the displacement of the plunger 36 in the cylinder 24, even during this initial movement, will be controlled by needle valve 42 of the fitting 34 in accordance with the desired preselected rate. The ball valve 52 constrains all the oil to pass through the needle valve in this direction, that is from the oil cylinder 24 to the reservoir 26.

After the plunger 36 has traversed the distance of the lost-motion connection, as described above, and contacts the sleeve 44, its further displacement in the oil cylinder causes the sleeve to be moved therewith. This further displacement of both the plunger and the sleeve will be at the preselected rate of feed of the drill, as controlled by needle valve 42, and will continue until the completion of that particular step, at which time the drill is to be withdrawn from the workpiece and returned for a succeeding step.

As the drill is withdrawn from the workpiece, stud 12 disengages plunger end cap 40. The frictional resistance of the sleeve 44 within the cylinder 24 is sufficient to retain the sleeve in its position in the cylinder, which results in the raising of the plunger 36 with its piston 38 under the influence of coil spring 46 to restore the original lost-motion connection. As piston 38 rises until it contacts the lower surface of sleeve 44, the level of the oil in cylinder 24 also rises, as ball valve 52 permits the free flow of the fluid in this direction, that is from the reservoir 26 to the cylinder 24. The fluid pressure in the reservoir to cause this reverse flow can be effected by the oil head in the reservoir, or by the separate fluid pressure source connected to the reservoir as will be described below. It will be apparent from the drawings that needle valve 42 constrains the oil flow in this direction to pass through the floating ball valve 52.

Figure 3:
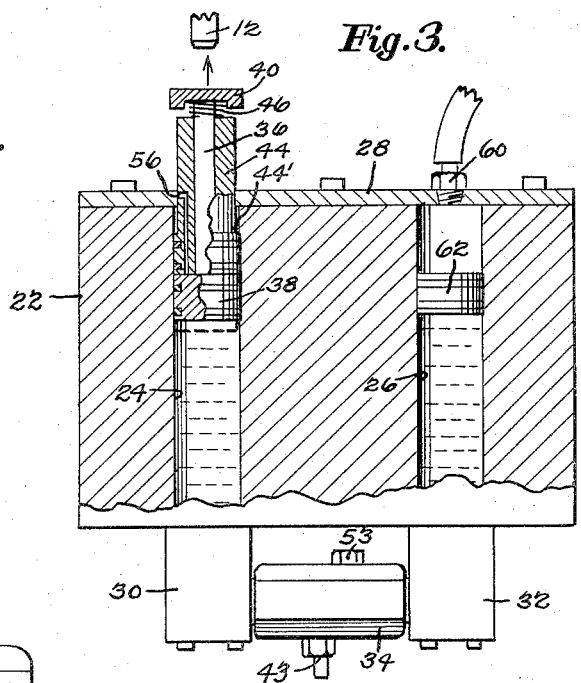
Fig. 3 is a longitudinal sectional view of the device of Fig. 1 illustrating the parts at the beginning of a succeeding drilling step, the position of the plunger at the end of the preceding step being shown in dotted lines.

Fig. 3 illustrates the elements of the device positioned as they would be after the drill has been withdrawn from the workpiece thereby disengaging stud 12 from plunger end cap 40 and permitting the lost-motion connection to be restored by coil spring 46. In this figure, the position of piston 38 at the end of the preceding drilling step, with the stud still contacting cap 40, is shown in dotted lines, it being appreciated that there is a space between the piston and the lower surface of the sleeve, as in Fig. 2.

The plunger having been moved upwardly restoring the lost-motion connection in the manner described above as the drill is withdrawn from the workpiece, it will be engaged by the drill during the next step a short distance above the point of withdrawal. Thus, as the next drilling step commences, the drill may be rapidly returned until the end cap is again engaged which will be at this slightly higher position. The feeding rate of the drill is thus automatically reduced when the drill is positioned with respect to the workpiece just short of the point of its withdrawal.

The foregoing sequence is then repeated to complete the drilling of a hole by any number of the steps described above.

After a complete hole has been drilled, both the plunger 36 and sleeve 44 will have been displaced in the oil cylinder 24 to a position as determined by the depth of the hole drilled. To restore these elements to their initial positions for drilling another hole, the device is provided with a connection 60 communicating with the oil reservoir 26 for coupling thereto a source of fluid, preferably air, of sufficient pressure to force the oil in the reservoir through ball valve 52 into oil cylinder 24, thereby raising the plunger 36 and the sleeve 44 until a shoulder 44' on the latter abuts against end plate 28. Oil reservoir 26 is provided with a floating piston 62 for this purpose. The air pressure source can be controlled by any suitable means to normalize the device automatically at the completion of a drilling operation, and, if so desired, can provide the constant pressure head for restoring the lost-motion connection after each drilling step in the manner described above.

It will be appreciated that with the disclosed device attached to drilling machines as described above, or otherwise incorporated in the feeding mechanism of a drilling machine, it would only be necessary to provide means for controlling the drill to effect a rapid approach and withdrawal of the drill at desired intervals. The above described device controls the feeding of the drill during the drilling operation and automatically permits the drill to be rapidly returned to a position just short of the point of its withdrawal during the step-by-step or intermittent feeding operation. Thus, the disclosed device greatly simplifies the controls heretofore required for this operation.

The invention has been described as embodied in a dashpot device for controlling the feed of a drilling machine, but it will be understood that the invention has many other applications, and is susceptible of numerous modifications and variations by persons skilled in the art within the spirit and scope of the invention as defined in the following claims.

What is claimed is:

1. A device of the character described comprising; a fluid cylinder, a plunger having a piston displaceable in the cylinder, a member having a lost-motion connection with the plunger and adapted to be engaged thereby after the latter has been displaced a short predetermined distance in the cylinder whereupon it is moved therewith, means for retaining the member in its moved position, and resilient means normally urging said plunger in the direction of restoring said lost-motion connection while the member is retained in its moved position.

2. A device as defined in claim 1, including valve means regulating the fluid flow in one direction to control the displacement of the plunger in accordance with a preselected rate, and permitting full fluid flow in the reverse direction upon the restoration of said lost-motion connection under the influence of said resilient means.

3. A device of the character described comprising; a fluid cylinder, a movable plunger having a piston at one end displaceable in the cylinder, a movable sleeve free on the plunger and extending therewith into the cylinder, said sleeve having surfaces frictionally engaging said cylinder to retain same in its moved position, and a spring interposed between the sleeve and the end of the plunger remote from the piston, said spring normally urging the piston in the direction out of the cylinder while the sleeve is frictionally retained therein, thereby normally spacing that end of the plunger from the upper surface of the sleeve.

4. A device as defined in claim 3, including a fluid reservoir and valve means interconnecting said fluid cylinder with said fluid reservoir, said valve means comprising a first valve for regulating the rate of flow of the fluid in the forward direction from the cylinder to the reservoir, and a second valve for permitting full flow of the fluid in the reverse direction from the reservoir to the cylinder.

5. A device as defined in claim 4, including a connection to said fluid reservoir for coupling thereto a source of fluid for returning the plunger and the sleeve to their initial positions.

6. A device of the character described for controlling the movement of a movable element comprising; a fluid cylinder, a plunger engageable at one end thereof by the moveable element and having a piston at its opposite end displaceable thereby in the cylinder, a member having a lost-motion connection with the plunger and adapted to be engaged thereby after the latter has been displaced a predetermined distance in said cylinder whereupon it is moved therewith, means for retaining the member in its moved position, and resilient means normally urging said plunger in the direction of restoring said lost-motion connection upon disengagement with the movable element while the member is retained in its moved position.

7. A device as defined in claim 6, including valve means regulating the fluid flow in one direction to control the displacement of the plunger in the fluid cylinder in accordance with a preselected rate, and permitting full fluid flow in the reverse direction upon the restoration of said lost-motion connection under the influence of said resilient means.

8. Apparatus of the character described for controlling the feed of a machine tool and the like during a step-by-step feeding operation where the tool is withdrawn from the workpiece and returned during each step, comprising; a machine tool having means for feeding same, an element carried by the machine tool and movable therewith during feeding thereof, a fluid cylinder, a feed control plunger engageable by the element of the machine tool during the feeding of the tool and displaceable thereby in the cylinder in accordance with a preselected rate of feed of the tool, a member normally spaced from the plunger and movable thereby after the latter has been displaced a predetermined distance, means for retaining the member in its moved position, and resilient means for returning the plunger the said predetermined distance with respect to the member when the plunger is released from engagement with the element of the machine during withdrawal of the tool while the member is retained in its moved position, whereby the tool may be rapidly returned for the succeeding step to a position just short of the point of its withdrawal.

9. Apparatus of the character described for controlling the feed of a machine tool and the like during a step-by-step feeding operation where the tool is withdrawn from the workpiece and returned during each step, comprising; a machine tool having means for feeding same, an element carried by the machine tool and movable therewith during feeding thereof, a housing having a fluid cylinder therein, a feed control plunger engageable by the element of the machine tool during the feeding of the tool and displaceable thereby in the cylinder in accordance with a preselected rate of feed of the tool, a sleeve free on said plunger and extending therewith in said cylinder and movable by the plunger after the latter has been displaced a predetermined distance, said sleeve having surfaces frictionally engaging said cylinder to be retained therein when in its moved position, and a spring interposed between a portion of said plunger and the sleeve for returning the plunger the said predetermined distance, while the sleeve is frictionally retained in the cylinder, when the plunger is released from engagement with the element of the machine during withdrawal of the tool, whereby the tool may be rapidly returned for the succeeding step to a position just short of the point of its withdrawal.

10. The apparatus defined in claim 9, wherein said housing includes a fluid reservoir and valve means interconnecting said fluid cylinder with the fluid reservoir, said valve means comprising a first valve for regulating the rate of flow of the fluid in the forward direction from the cylinder to the reservoir to control the rate of feed of the tool, and a second valve for permitting full flow of the fluid in the reverse direction from the reservoir to the cylinder upon the return of the plunger the said predetermined distance under the influence of said spring.

11. The apparatus defined in claim 10, including means for returning the plunger and the sleeve to their initial positions at the end of a complete feeding operation.

References Cited in the file of this patent

UNITED STATES PATENTS

| | | |
|---|---|---|
| 2,571,279 | Myklestad | Oct. 16, 1951 |
| 2,730,354 | Burris | Jan. 10, 1956 |
| 2,765,054 | Rossman | Oct. 2, 1956 |